United States Patent
Gangnet

[19]

[11] Patent Number: 6,154,221

[45] Date of Patent: Nov. 28, 2000

[54] PARAMETRIC FUNCTION CURVE EDITING

[75] Inventor: Michel Gangnet, Saint-Germain en Laye, France

[73] Assignee: Avid Technology, Inc., Tewksbury, Mass.

[21] Appl. No.: 08/834,496

[22] Filed: Apr. 4, 1997

[51] Int. Cl.[7] .................................................. G06T 11/20
[52] U.S. Cl. .......................................... 345/442; 345/474
[58] Field of Search ..................................... 345/442, 443, 345/474

[56] References Cited

U.S. PATENT DOCUMENTS

| | | | |
|---|---|---|---|
| 5,317,682 | 5/1994 | Luken, Jr. ............................... | 345/442 |
| 5,422,990 | 6/1995 | Silverbrook et al. .................... | 345/442 |
| 5,717,848 | 2/1998 | Watanabe et al. ....................... | 345/442 |
| 5,717,905 | 2/1998 | Iwanmoto et al. ....................... | 345/442 |

*Primary Examiner*—Mark K. Zimmerman
*Assistant Examiner*—Huedung X. Cao
*Attorney, Agent, or Firm*—Gowling Lafleur Henderson Toronto, Ontario Canada

[57] ABSTRACT

A method of and system for editing a parametric function curve initializes tangent handles at selected keys, up-dates the parametric function curve responsive to the dragging of one of the tangent handles, verifies whether the up-dated parametric function curve is monotonic, and if not monotonic, repeatedly modifies the tangent handles until the parametric function curve is monotonic.

11 Claims, 2 Drawing Sheets

६,१५४,२२१

PARAMETRIC FUNCTION CURVE EDITING

FIELD OF THE INVENTION

The present invention relates to a system for editing a parametric function curve.

BACKGROUND OF THE INVENTION

Most computer based animation systems use function curves to model how the value of an animated variable is modified over time. Function curves editors have been based on either functional splines or parametric splines.

Examples of splines include Bézier, Cardinal, B-Spline or Hermite. All of these splines can be either functional or parametric. A functional cubic Bézier spline is defined by a piecewise function made of cubic polynomials and a parametric cubic Bézier spline is defined by a set of parametric cubic curves. In order to define a function, a parametric spline must have one of its components, e.g. the X component, always increasing with respect to the parameter.

It is theoretically possible to achieve the same curve shape by the two methods. However, functional splines requires a much larger number of points for defining the function curve than the number required for parametric splines. As a result, users view parametric function curves as giving more and easier control on the animation.

In both systems, the editing process starts by the user creating a number of keys on a function curve. A key is a time and value pair defined by the user. A function curve is thus an ordered set of function curve segments separated by keys. When the user wants to modify the shape of a function curve segment between two keys, new intermediate keys can be added that better approximate the desired shape and therefore augment the number of segments. Additionally, other controls that modify the curve segment shape can be used.

The function curve editor used in SOFTIMAGE 3D v3.5 is based on functional splines. The function curve F is a piecewise polynomial function of t, time. At each key which is used to define the function F, a tangent is provided for the user to manipulate. The user can only modify the direction of the tangent. The tangent length cannot be modified because it is fixed when using functional polynomial splines.

Functional splines have only two degrees of freedom, the tangent direction at both ends, for controlling the function curve shape between two keys. In contrast, parametric splines has four degrees of freedom, the tangent direction and the tangent length at both ends. Therefore, the set of curve shape that can be reached by the former system is much smaller than the set that can be reached by the latter.

The function curve editor used in the Particle module of SOFTIMAGE 3D v3.51 is based on parametric splines. A tangent is provided for modifying the slope of the spline at the key. The user edits a curve segment by dragging key tangent handles, controlling the tangent angle and the tangent length. However, if the new tangent defines a new parametric curve segment which is not monotonic in the X direction, unusable pieces of the curve segment are highlighted or signalled to the user who must then modify the tangents so that the curve segment verifies the monotonicity condition.

SUMMARY OF THE INVENTION

The disadvantages of the prior art may be overcome by providing a system for editing a function curve which automatically maintains a monotonicity condition.

It is desirable to provide an editing system that applies to parametric function curves to allow the user to freely edit the function curve while automatically maintaining curve consistency.

It is desirable to provide a method for manipulating tangents of a parametric function curve while maintaining the monotonicity condition.

It is desirable to provide a method of and system of editing a parametric function curve which initializes tangent handles at selected keys, up-dates the parametric function curve responsive to the dragging of a selected on of the tangent handles, verifies whether the up-dated parametric function curve is monotonic, and if not monotonic, repeatedly modifies the neighbouring tangent handles until the parametric function curve is monotonic.

According to one aspect of the invention, there is provided a method editing a parametric function curve. The method comprises the steps of:

(i) initializing tangent handles at each of a first and second key, (ii) up-dating the parametric function curve responsive to dragging of one of the tangent handles, (iii) verifying whether the up-dated parametric function curve is monotonic, and (iv) if not monotonic, repeatedly modifying the parametric function curve until monotonic.

According to another aspect of the invention, there is provided a method modifying a parametric function curve responsively to dragging of a tangent handle of a key. The method comprises the steps of:

(i) determining a first vector defining a tangent handle of a first key, (ii) determining a second vector defining a tangent handle of a second key adjacent the first key, (iii) determining a third vector defining the tangent handle of the first key after dragging, (iv) determining an amended parametric function curve segment between the first and second key defined by the third and second vectors and by the two keys, (v) verifying whether the amended parametric function curve section is monotonic, (vi) if monotonic, updating the parametric function curve with the amended parametric function curve section, (vii) if not, determining a fourth vector defining a first candidate position of the tangent handle of the second key, (vii) determining an amended parametric function curve section between the first and second key defined by the third and fourth vectors and by the two keys, (ix) verifying whether the amended parametric function curve section is monotonic, (x) if monotonic, updating the parametric function curve with the amended parametric function curve section, (xi) if not, selecting a normalized fifth vector defining a second candidate position of the handle of the first key, (xii) determining an amended parametric function curve section between the first and second key defined by the fifth and fourth vectors and by the two keys, (xiii) verifying whether the amended parametric function curve section is monotonic, (xiv) if monotonic, updating the parametric function curve with the amended parametric function curve section, (xv) if not, repeating steps (vii) and (xiv).

BRIEF DESCRIPTION OF THE DRAWINGS

Drawings which will illustrate embodiments of the present invention will now be described, by way of example only, with reference to the attached Figures, wherein.

DETAILED DESCRIPTION OF THE INVENTION

Figure 1:
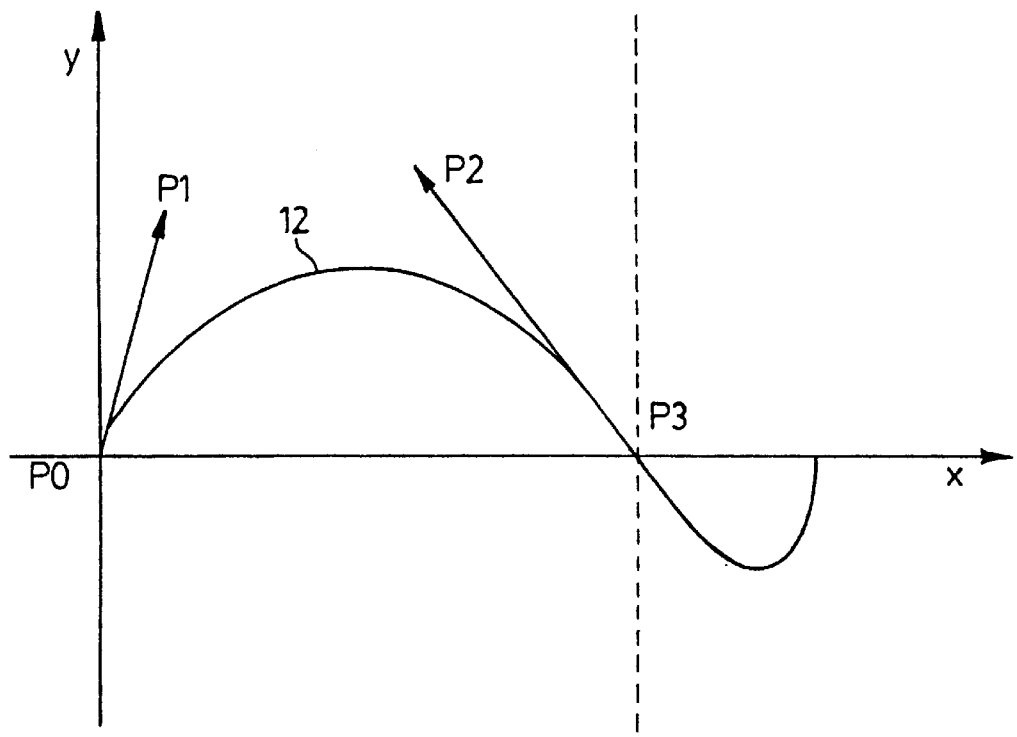
FIG. 1 is a graphical illustration of a parametric function curve of the present invention.

Referring to FIG. 1, a parametric function curve segment 12 is defined as a polynomial cubic Bézier curve. In other words, the curve segment 12 between the two keys $P_0(x_0, y_0)$ and $P_3(x_3, y_3)$, with $x_3 > x_0$, is defined by the control points $P_1(x_1, y_1)$ and $P_2(x_2, y_2)$. The curve segment equations are:

$$X(u) = (1-u)^3 x_0 + 3u(1-u)^2 x_1 + 3u^2(1-u) x_2 + u^3 x_3 \quad (1)$$

$$Y(u) = (1-u)^3 y_0 + 3u(1-u)^2 y_1 + 3u^2(1-u) y_2 + u^3 y_3 \quad (2)$$

$\mu$ is the interval $[0, 1]$. The tangent handle at $P_0$ is the point $P_1$. The tangent handle at $P_3$ is the point $P_2$. The monotonicity condition is expressed by the fact that the derivative of X is non-negative is u in $[0, 1]$. The following four inequations must therefore be true for all u in $[0, 1]$:

$$x_3 > x_0 \quad (3)$$

$$x_1 \geq x_0 \quad (4)$$

$$x_2 \leq x_3 \quad (5)$$

$$(x_3 - 3x_2 + 3x_1 - x_0)u^2 + 2(x_2 - 2x_1 + x_0) u + (x_1 - x_0) \geq 0 \quad (6)$$

Four control points $P_0, P_1, P_2, P_3$, whose x coordinates verify these inequations, form a valid function curve segment.

For a monotonic parametric cubic curve segment it can be shown that the x component of the vectors joining $P_0$ to $P_1$ and $P_3$ to $P_2$ cannot have an absolute value greater than ⅓ of the x distance between the two keys, namely $x_3 = x_0$. Therefore, the up-date module 15 uses this result in step 1.

Figure 2:
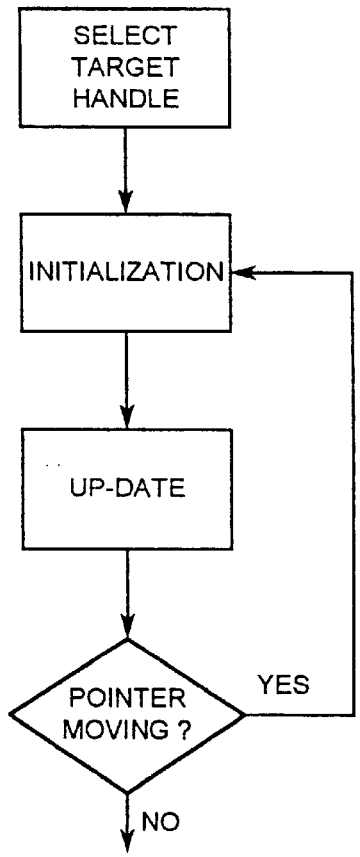
FIG. 2 is a flowchart of the system of the present invention.

Referring to FIG. 2, the system of the present invention has two modules: an initialization module 13 and an up-date module 15. Initialization module 13 is executed on the mouse down event associated with the tangent handle selection. Up-date module 15 is executed for each mouse move event associated with a new position of the mouse pointer. As the function curve segment is left in a consistent state after each movement, there is no need for a finalization module on the mouse up event.

The system of the present invention is described when editing the tangent handle $P_1$, similar computations are made if editing $P_2$. If editing $P_2$, replace $P_0$ by $P_3$ and $P_1$ by $P_2$.

Initialization

The initial coordinate values for the four points $P_0, P_1, P_2, P_3$ are recorded in a content data structure that is made accessible up to the mouse up event $P_0$ and $P_3$ will not be modified during the process and could also be read on the curve when necessary. Vectors $P_1 P_0$ and $P_3 P_2$ are normalized and stored in the context data structure for further use.

Up-date

When the user moves the mouse pointer while dragging a tangent handle, the system generates an event containing the current point $C_1$ with coordinates $(x_{c1}, y_{c1})$. When receiving this event, the following steps are undertaken:

1. $C_1$ is the candidate point for the new value of $P_1$. If $x_{c1}$ is strictly smaller than $x_0$, $x_{c1}$ is replaced by $x_0$. This step can be replaced by any other method which replaces $x_{c1}$ by a value greater or equal to $x_0$. If $x_{c1}$ is strictly greater than $x_3 + \frac{1}{3}(x_3 - x_0)$, $C_1$ coordinates are replaced by those of the unique point whose x coordinate is equal to $x_3 + \frac{1}{3}(x_3 - x_0)$ and which is on the line segment $P_0 C_1$.

2. If the four points $P_0, C_1, P_2, P_3$ define a valid curve segment, $C_1$ is accepted as the new $P_1$ point. The context data structure and the function curve are then up-dated, and the up-date module returns.

3. Otherwise, the method computes the coordinates $(x_{c2}, y_{c2})$ of $C_2$, a candidate point for $P_2$. First, the interval $[x_{2low}, x_{2high}]$ associated with the current value of $x_{c1}$ is computed. If this interval is not empty, $x_{c2}$ is set to either $x_{2low}$ or $x_{2high}$ according to which is closest to the x coordinate of the initial $P_2$ point stored during the initialization module. Then, $y_{c2}$ is computed so that the vector $P_3 C_2$ is collinear to and has same direction as the vector $P_3 P_2$ stored at initialization. If the four points $P_0, C_1, C_2, P_3$ define a valid curve segment, $C_1$ and $C_2$ are accepted as the new $P_1$ and $P_2$. The context data structure and the function curve are then up-dated, and the up-date module returns.

4. Otherwise, either the interval $[x_{2low}, x_{2high}]$ is empty or the four points $P_0, C_1, C_2, P_3$ are not valid. In both cases the proposed method tries to compute a new candidate point for $P_1$, $D_1$ by exchanging the roles of $P_1$ and $P_2$ in step 3. First, the interval $[x_{1low}, x_{1high}]$ associated with the x coordinate of the initial $P_1$ point stored at initialization is computed. If this interval is not empty, $x_{D1}$ is set to either $x_{1low}$ or $x_{1high}$ according to which is closer to $x_{c1}$. Then, $y_{D1}$ is computed so that the vector $P_0 D_1$ is collinear to and has same direction as the vector $P_0 C_1$. If the four points $P_0, D_1, P_2, P_3$ define a valid curve segment, $D_1$ is accepted as the new $P_1$, the context data structure and the function curves are up-dated, and the up-date module returns.

5. Otherwise, the function curve segment is not modified. However, this case never happens. One of the steps 2, 3, or 4 is always successful.

The effect of the system and method is that the neighboring tangent handles are modified responsive to the user input in manipulating a selected tangent handle in order to maintain the monotonicity condition of the parametric function curve segment.

Validity Test

Four points define a valid function curve segment if in equations (3) to (6) hold. Testing (3) to (5) is trivial. The left side of (6) is a quadratic function of $\mu$ which must be non-negative for all $\mu$ in $[0, 1]$. There are several ways to test this condition. The preferred methods computes the quadratic equation's minimum and texts that this minimum is non-negative.

Interval Computation

Let $Q(\mu)$ be the left side of equation (6), $Q(\mu)$ is not negative over $[0, 1]$ if and only if $Q(\mu_{min})$ is not negative where $\mu_{min}$ is the value where $Q(\mu)$ reaches its minimum. As it is straightforward to compute the value where a quadratic function reaches its minimum over an interval, $Q(\mu_{min})$ can be written as a function of $x_2$, G, with:

$$G(x_2) = -x_2^2 + (x_1+x_0)x_2 + x_3(x_1-x_0) - x_1^2 \quad (7)$$

The limit of $G(x_2)$ equals minus infinity when $x_2$ gets to plus or minus infinity. Therefore, either $G(x_2)$ is strictly negative for all $x_2$, or there are two roots $r_1$ and $r_2$ with $r_1$ smaller or equal to $r_2$ such that $Q(x_2)$ is non-negative for $x_2$ in the interval $r_1 r_2$.

A similar step is taken when determining the interval for $x_1$.

Although the description thus far has described the tangent handles $P_1$, $P_2$ as emanating from the control points $P_0$, $P_3$, respectively, it is now readily apparent to those skilled in the art that supplementary tangent handles can extend radially opposite to the tangent handles $P_1$, $P_2$. Movement of one tangent handle will affect the curve C on the opposite side of the key in a supplemental manner. For example, if a supplemental tangent handle of the key is being manipulated as a result of user manipulation of the selected handle and the user specifies colinearity of the two tangents, a candidate for the supplemental tangent handle is determined just as the candidate had been defined the user directly editing the selected handle.

Figure 3:
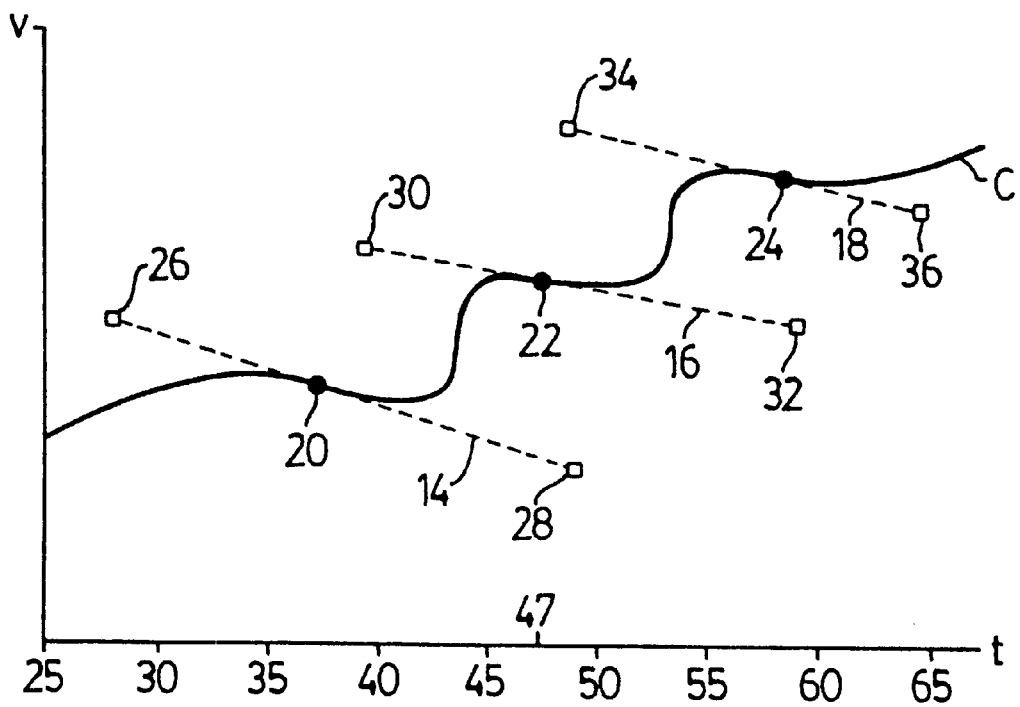
FIG. 3 is a screen display of a function curve being edited by the present invention.

Referring to FIG. 3, the present invention is best described with reference to the following example. FIG. 3 illustrates a function curve F, which is a parametric function defined by a piecewise polynomial parametric 2D curve C. v is the value of a given variable and t is the time, such that v=F(t). The function F must be a true function, that is, there must be a single value v associated to each time value t.

Let $c=X(\mu)$ and $y=Y(\mu)$ b the two functions associated with the coordinates C, $\mu$ being the curve parameter. Evaluating the function curve at time t involves two steps:

a given time t, find the unique value $\mu_1$ of $\mu$ such that $t=X(\mu_t)$, and b) compute the result $v=Y(\mu_1)$.

A necessary condition to solve the first step is that the function $x=X(\mu)$ is monotonic, that is, either increasing for all value of $\mu$ or decreasing for all values of $\mu$. It is assumed that x is increasing, although similar results would be achieved if x is assumed to be decreasing.

When editing a function curve, the user van modify the curve C, and hence the function curve F, through a number of editing tools. Whatever the action of these tools on the curve, the monotonicity condition on $X(\mu)$ must be enorced. The present invention lets the user edit the curve with maximum freedom regarding the function curve shape while automatically maintaining the monotonicity condition.

A tangent handle is provided for modifying or braking the slope of the spline at each of the keys. In the example of FIG. 3, tangent handles 14, 16 and 18 are provided at keys 20, 22, 24, respectively. Each end of the tangent handles 14, 16 and 28 have boxes 26, 28, 30, 32 and 34 and 36, respectively. The respective boxes at opposite ends of the tangent handles are ganged together so that the movement of one box will supplementarily move the box at the opposite end of the tangent handle.

The user edits a curve segment by clicking the mouse pointer on one of the boxes at the end of the tangent handles and dragging the selected key tangent handles, controlling the tangent angle and the tangent length.

Figure 4:
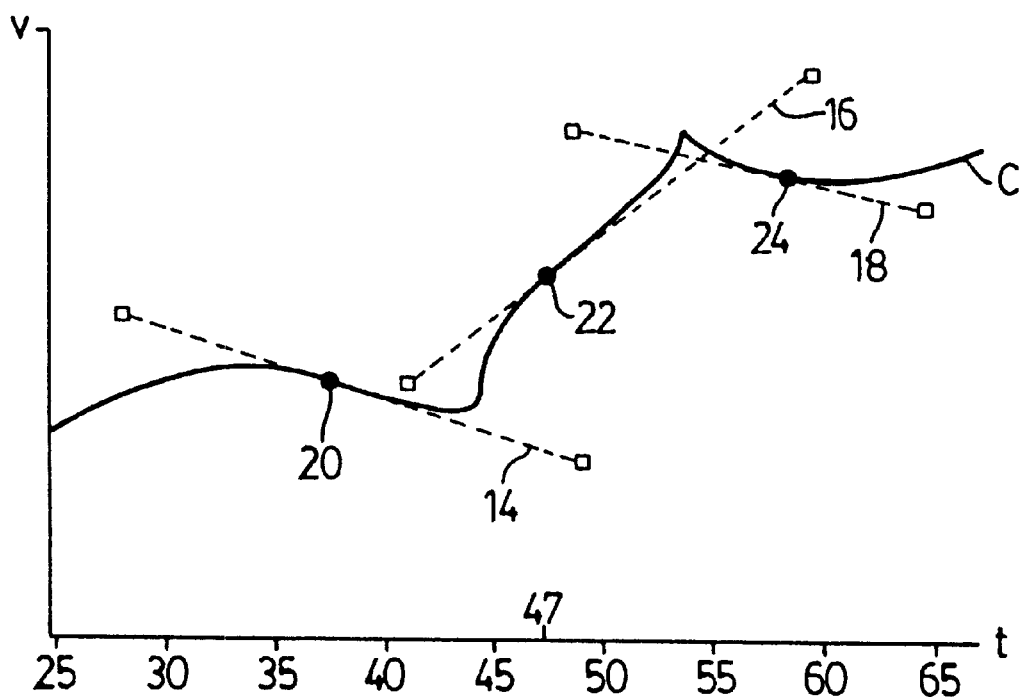
FIG. 4 is a screen display of the function curve of FIG. 3 after being edited by the present invention.

In the example, a user has moved the mouse pointer to box 32 and has clicked and dragged the box to the position illustrated in FIG. 4. Responsively, the tangent handle 16 moves with the mouse pointer about the key 22. It is assumed at this point that the function curve segment is feasible, tat is, the function verifies the four inequations.

On each incremental movement of the handle 16, the system goes through the Initialization module 13 and then the Up-date module 15. After each incremental movement of the box 32, the curve C is responsively up-dated and revised. If the user is satisfied with the edit, the user can save the edited function curve for future use.

This invention applies to all types of function curves and is not limited to those mapping time to value. For example, in a computer-based paint system the present invention would apply to the function curve associating a brush color to the pressure applied to the pen when using the brush.

The present invention describes a method to modify a curve segment. Throughout the discussion it has been assumed, without loss of generality, that time and value at the two keys limiting the segment are fixed.

The above described embodiments of the present invention are intended to be examples of the invention and alterations and modifications may be effected thereto, by those of skill in the art, without departing from the scope of the invention which is defined solely by the claims appended hereto.

I claim:

1. A method for modifying parameters of an animated variable, comprising the steps of:

(i) providing a parametric function curve for modelling values of an animated variable over time;

(ii) initializing tangent handles at each of a first and a second key located on the parametric function curve;

(iii) selecting one of the tangent handles;

(iv) dragging the selected tangent handle to a new position to modify the parametric function curve;

(v) up-dating the parametric function curve responsive to the new position;

(vi) verifying whether the domain of the up-dated parametric function curve is monotonic;

(vii) if not monotonic, repeatedly modifying the parametric function curve until its domain is monotonic; and (viii) rendering the animated variable in accordance with the modified parametric function curve.

2. A method as claimed in claim 1 wherein said step of initializing comprises the steps of:

(i) determining a first vector defining a tangent handle of a first key, and (ii) determining a second vector defining a tangent handle of a second key adjacent said first key.

3. A method as claimed in claim 2 wherein the step of up-dating the parametric function curve comprises the steps of:

(i) determining a third vector defining the selected tangent handle after dragging; and (ii) determining a modified parametric function curve section between the first and second key defined by the third vector and the vector of the unselected tangent handle.

4. A method as claimed in claim 3 wherein the step of repeatedly modifying includes the steps of:

(i) determining a fourth vector defining a first candidate position of the unselected tangent handle;

(ii) determining an amended parametric function curve section between the first and second key defined by the third and fourth vectors;

(iii) determining a fifth vector defining a second candidate position of the selected tangent handle; and (iv) determining a modified parametric function curve section between the first and second key defined by the fifth and fourth vectors.

5. A computer implemented animation system, comprising:
   (i) modelling means for determining a parametric function curve of an animated variable over time;
   (ii) means for initializing tangent handles at each of a first and second key located on the parametric function curve;
   (iii) means for selecting one of the tangent handles;
   (iv) means for dragging the selected tangent handle to a new position;
   (v) means for up-dating the parametric function curve responsive to the new position of the selected tangent handle;
   (vi) means for verifying whether the domain of the up-dated parametric function curve is monotonic;
   (vii) means for repeatedly modifying the parametric function curve until its domain is monotonic; and
   (viii) an animation engine for rendering the animated variable in response to the modified parametric function curve.

6. A computer implemented animation system as claimed in claim 5 wherein said means for initializing comprises:
   (i) means for determining a first vector defining a tangent handle of a first key, and
   (ii) means for determining a second vector defining a tangent handle of a second key adjacent said first key.

7. A computer implemented animation system as claimed in claim 6 wherein the means for up-dating the parametric function curve comprises:
   (i) means for determining a third vector defining the selected tangent handle after dragging; and
   (ii) means for determining a modified parametric function curve section between the first and second key defined by the third vector and the vector of the unselected tangent handle.

8. A computer implemented animation system as claimed in claim 7 wherein the means for repeatedly modifying includes:
   (i) means for determining a fourth vector defining a first candidate position of the unselected tangent handle;
   (ii) means for determining an amended parametric function curve section between the first and second key defined b the third and fourth vectors,
   (iii) means for determining a fifth vector defining a second candidate position of the selected tangent handle; and
   (iv) means for determining a modified parametric function curve section between the first and second key defined by the fifth and fourth vectors.

9. A computer implemented animation system as claimed in claim 8 wherein said means for determining a fourth vector comprises:
   (i) means for computing a range of x coordinates within a predetermined interval from the second vector;
   (ii) means for selecting the x coordinate closest to the second vector; and
   (iii) means for computing a y coordinate so that the fourth vector is collinear to and in the same direction as the second vector.

10. A computer implanted animation system as claimed in claim 9 wherein said means for determining a fifth vector comprises:
    (i) means for computing a range of x coordinates with a predetermined interval from first vector;
    (ii) means for selecting the x coordinate closest to the first vector; and
    (iii) means for computing a y coordinate to that the fifth vector is collinear to and in the same direction as the third vector.

11. A computer implemented animation system as claimed in claim 5 wherein said system further comprises means for limiting a magnitude of the selected tangent handle.

* * * * *